United States Patent
Choi

(10) Patent No.: US 9,361,847 B2
(45) Date of Patent: Jun. 7, 2016

(54) DISPLAY DEVICE AND DRIVING METHOD THEREOF

(71) Applicant: Samsung Display Co., Ltd., Yongin, Gyeonggi-Do (KR)

(72) Inventor: Deok Jun Choi, Cheonan-si (KR)

(73) Assignee: Samsung Display Co., Ltd., Gyeonggi-Do (KR)

( * ) Notice: Subject to any disclaimer, the term of this patent is extended or adjusted under 35 U.S.C. 154(b) by 54 days.

(21) Appl. No.: 14/299,950

(22) Filed: Jun. 9, 2014

(65) Prior Publication Data

US 2015/0161955 A1    Jun. 11, 2015

(30) Foreign Application Priority Data

Dec. 9, 2013    (KR) .................. 10-2013-0152665

(51) Int. Cl.
*G09G 5/00*    (2006.01)
*G09G 3/36*    (2006.01)
*G06F 3/044*    (2006.01)
*G06F 3/041*    (2006.01)
*G09G 3/20*    (2006.01)

(52) U.S. Cl.
CPC .............. *G09G 3/3688* (2013.01); *G06F 3/044* (2013.01); *G06F 3/0412* (2013.01); *G06F 3/0416* (2013.01); *G09G 3/3696* (2013.01); *G09G 3/2092* (2013.01); *G09G 3/3677* (2013.01); *G09G 3/3685* (2013.01); *G09G 2310/0232* (2013.01); *G09G 2310/0278* (2013.01); *G09G 2310/08* (2013.01)

(58) Field of Classification Search
None
See application file for complete search history.

(56) References Cited

U.S. PATENT DOCUMENTS

| | | | | |
|---|---|---|---|---|
| 8,732,376 B2* | 5/2014 | Saitoh | .............. | G06F 3/041 345/173 |
| 8,928,639 B2* | 1/2015 | Lee | .............. | G06F 13/14 345/204 |
| 9,123,309 B2* | 9/2015 | Jeon | .............. | G09G 3/3696 |
| 9,189,100 B2* | 11/2015 | Ha | .............. | G06F 3/0416 |
| 2004/0239602 A1* | 12/2004 | Kim | .............. | G09G 3/3611 345/87 |
| 2006/0017853 A1 | 1/2006 | Chang et al. | | |
| 2007/0091013 A1* | 4/2007 | Pak | .............. | G02F 1/13338 345/50 |
| 2007/0195032 A1* | 8/2007 | Lee | .............. | G06F 3/0412 345/87 |
| 2011/0157064 A1* | 6/2011 | Imai | .............. | G06F 3/0416 345/173 |
| 2011/0205344 A1* | 8/2011 | Lee | .............. | G02B 27/2264 348/56 |
| 2011/0216058 A1* | 9/2011 | Oh | .............. | G09G 3/3614 345/213 |
| 2012/0262390 A1* | 10/2012 | Kida | .............. | G06F 3/041 345/173 |
| 2013/0038621 A1* | 2/2013 | Choi | .............. | G09G 3/2092 345/589 |
| 2013/0100099 A1* | 4/2013 | Chuei | .............. | G09G 3/3466 345/208 |

FOREIGN PATENT DOCUMENTS

| | | |
|---|---|---|
| JP | 09-121194 A | 5/1997 |
| JP | 2013-084195 A | 5/2013 |
| KR | 10-0425091 B1 | 3/2004 |
| KR | 10-0504077 B1 | 7/2005 |
| KR | 10-2012-0106214 A | 9/2012 |

* cited by examiner

Primary Examiner — Dismery Mercedes
(74) Attorney, Agent, or Firm — Knobbe, Martens, Olson & Bear, LLP

(57) ABSTRACT

A display device with a signal controller is disclosed. The display device includes a display panel, a scan driver, a data driver, a touch screen including a touch controller, a graphics controller and a signal controller. The signal controller generates a multiple control signal for controlling the timing of recording of an image signal and the timing of driving of the touch screen panel. The signal controller transmits the multiple control signal to the graphics controller and the touch controller.

20 Claims, 6 Drawing Sheets

DISPLAY DEVICE AND DRIVING METHOD THEREOF

CROSS-REFERENCE TO RELATED APPLICATIONS

This application claims priority under 35 U.S.C. §119 to Korean Patent Application No. 10-2013-0152665 filed in the Korean Intellectual Property Office on Dec. 9, 2013, the entire contents of which are incorporated herein by reference.

BACKGROUND

1. Field

The described technology generally relates to a display device and a driving method thereof; particularly, to a display device including a touch screen panel and a driving method thereof.

2. Description of the Related Technology

A display panel such as a liquid crystal display (LCD) and an organic light emitting diode display typically includes a plurality of scanning lines and a plurality of data lines which are connected to a plurality of pixels. The pixels are formed at the intersection of the scanning lines and the data lines. Scanning signals having a gate-on voltage are sequentially applied to the plurality of scanning lines and data signals corresponding to the scanning signals having the gate-on voltage are applied to the plurality of data lines, thereby writing image data in the plurality of pixels.

A touch screen panel is an input device, which detects a user's commands by recognizing the position where the user touches the touch screen panel. The touch screen panel is attached to a display device to identify a user's inputs by determining the position touched by the user's hands or an object. Touch screen panels are commonly capacitive type. The capacitive touch screen panel senses the change in electrostatic capacity between an electrode and a conductive object such as a user's fingers, The touch screen panels generally detect a change in electrostatic capacitance of a touch contact position by sequentially applying sensing signals to a plurality of sensing lines.

Because the touch screen panel is generally placed above the surface of the display panel, noise due to the data and scan signals of the display panel can interfere with the detection signals of the touch screen panel. Noise and interference can be minimized by controlling the timing of the application of the detection, scan and data signals.

Generally, a driving integrated circuit (IC) including a memory is used to apply the data signals to the data lines. The driving IC including the memory receives and stores an image signal, and then outputs the data signals according to the timing of the application of the scan signals.

If the recording rate of an image signal inputted to the driving IC is greater or less than a rate at which image data is written in the pixels, tearing can occur. Tearing might be minimized by appropriately controlling the timing of the recording.

The above information in the Background section is only for enhancement of understanding of the background of the technology and therefore it should not be construed as admission of existence or relevancy of the prior art.

SUMMARY OF CERTAIN INVENTIVE ASPECTS

One inventive aspect is a display device including, a display panel configured to include a plurality of pixels, a scan driver for applying a scanning signal having a gate-on voltage to a plurality of scan lines connected to the pixels, a data driver for applying a data signal to a plurality of data lines connected to the pixels, and a signal controller for controlling operations of the scan driver and the data driver by receiving an image signal from a graphics controller; and a touch screen panel configured to include a touch controller for detecting a touch position by receiving a detection signal from a plurality of sensing electrodes, wherein the signal controller generates a multiple control signal for controlling a timing of recording of the image signal and a timing of driving of the touch screen panel and the signal controller is further configured to transmit the multiple control signal to the graphics controller and the touch controller.

The multiple control signal can be a waveform that switches between a high level voltage and a low level voltage in a frame, and maintains the high level voltage in a porch period between a plurality of frames.

The multiple control signal can switch between the high level voltage and the low level voltage by one horizontal period in the frame period.

The scanning signal having the gate-on voltage can be sequentially applied to the scanning lines in a pulse width of the horizontal period.

The multiple control signal can switch to the low level voltage one horizontal period before the porch period ends.

The multiple control signal can switch to the high level voltage when the porch period ends.

The graphics controller can be further configured to start a first recording of the image signal after the porch period starts.

The first recording time can be one horizontal period or more.

The touch controller can be further configured to drive the touch screen panel for a duration after a second recording of the image signal when the multiple control signal switches to the high level voltage in the frame.

The second recording time can be shorter than one horizontal period.

The multiple control signal can switch to and maintain the high level voltage a delay time after the frame ends.

The touch controller can be configured to drive the touch screen panel as when the multiple control signal switches to the high level voltage in the frame.

The multiple control signal can be a waveform that switches between a high level voltage and a low level voltage in a frame and until a predetermined time after the frame ends, and maintains the high level voltage in a porch period between a plurality of frames after the predetermined time.

The graphics controller can be configured to record the image signal when the multiple control signal is maintained at the high level voltage in the porch period.

Another aspect provides a driving method of a display device, including, generating a multiple control signal in a waveform switched between a high level voltage and a low level voltage in a frame during which a data signal is applied to a plurality of pixels; generating the multiple control signal at the high level voltage in a porch period between a plurality of frames; performing a first recording of an image signal when the porch period starts; and driving the touch screen panel for a duration after a second recording of the image signal when the multiple control signal switches to the high level voltage in the frame.

The multiple control signal can switch between the high level voltage and the low level voltage by one horizontal period in the frame.

The multiple control signal can switch to the low level voltage one horizontal period before the porch period ends.

The multiple control signal can switch to the high level voltage when the porch period ends.

The first recording time can be one horizontal period or more.

The second recording time can be shorter than one horizontal period.

DETAILED DESCRIPTION OF CERTAIN EMBODIMENTS

Figure 1:
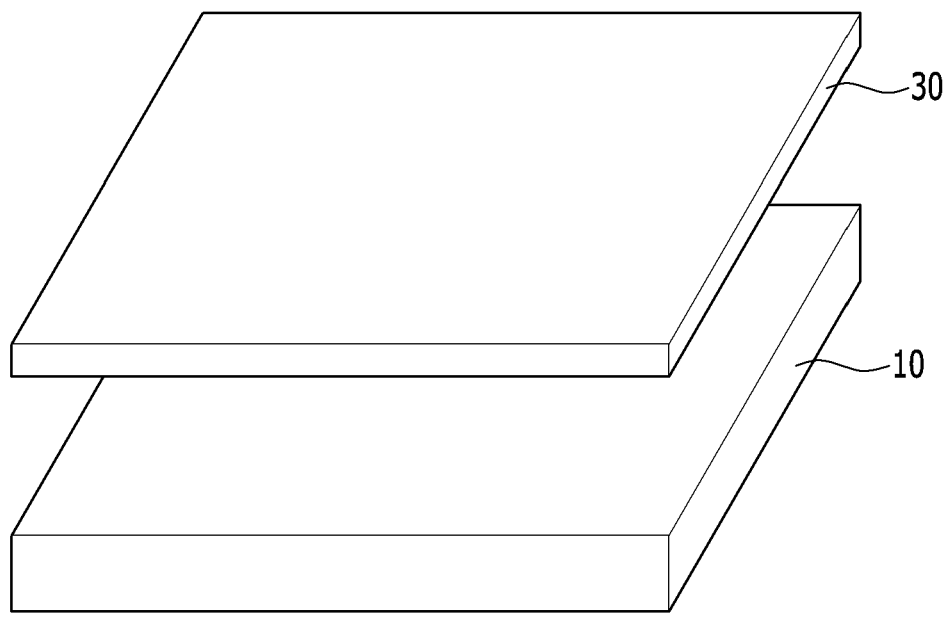
FIG. 1 is a perspective view showing a display device in accordance with an exemplary embodiment.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Example embodiments will now be described more fully hereinafter with reference to the accompanying drawings. However, the described embodiments may be embodied in different forms and should not be construed as limited to the embodiments set forth herein. Rather, these embodiments are provided so that this disclosure will be thorough and complete and will fully convey the scope of the described technology to those skilled in the art.

In the figures, dimensions may be exaggerated for clarity of illustration. It will be understood that when an element is referred to as being "between" two elements, it can be the only element between the two elements, or one or more intervening elements may also be present.

FIG. 1 is a perspective view showing a display device in accordance with an exemplary embodiment.

Referring to FIG. 1, the display device includes a display panel 10 and a touch screen panel 30 attached to the display panel 10. An adhesive layer (not shown) is provided between the display panel 10 and the touch screen panel 30 to adhere the display panel 10 to the touch screen panel 30.

An optical clear adhesive (OCA) may be employed as the adhesive layer.

The display panel 10 can be chosen from a variety of display types. These display types include, but are not limited to, an organic light emitting display (OLED), a liquid crystal display (LCD), an electroluminescent display (ELD), and a plasma display panel (PDP). Other types of displays can also be used.

The touch screen panel 30 can be implemented as various types, such as a resistive-type touch screen panel, a capacitance-type touch screen panel, an ultrasonic wave-type touch screen panel, an optical sensor-type touch screen panel, and an electro-magnetic induction-type touch screen panel.

Figure 2:
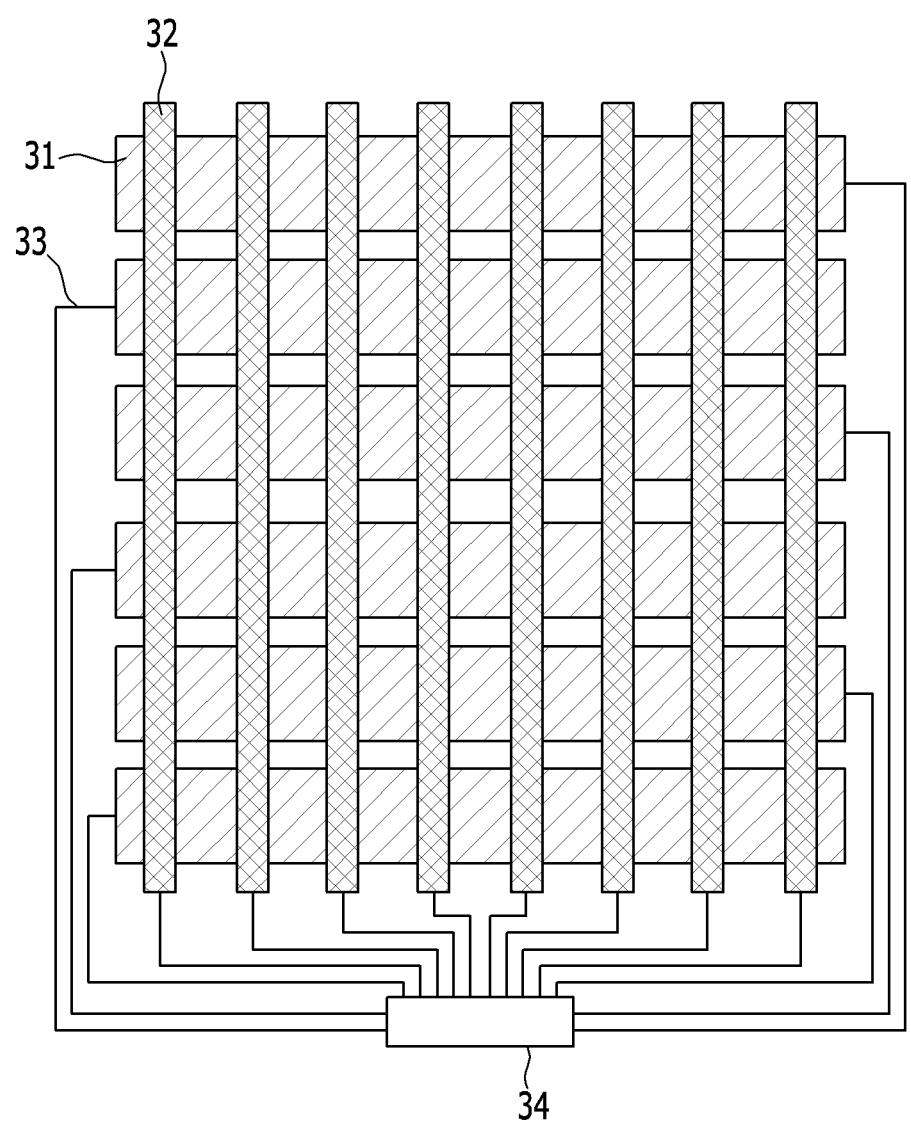
FIG. 2 is a schematic top plan view showing a touch screen panel in accordance with an exemplary embodiment.

FIG. 2 is described below assuming that the touch screen panel 30 is the capacitive touch screen panel However, other types of touch screen panel can also be used to implement the embodiments described below.

FIG. 2 is a schematic top plan view showing a touch screen panel in accordance with an exemplary embodiment. FIG. 2 shows an example of the touch screen panel 30 shown in FIG. 1.

Referring to FIG. 2, the touch screen panel 30 includes the driving electrodes 31 placed on a transparent substrate (not shown), and the sensing electrodes 32 placed on the driving electrodes 31. An insulating layer (not shown) may be disposed between the driving electrodes 31 and the sensing electrodes 32. The driving electrodes 31 and the sensing electrodes 32 may be connected to a touch controller 34 through the sensing wires 33.

The driving electrodes 31 can be placed in a first direction, and the sensing electrodes 32 can be placed in a second direction that is perpendicular to the first direction. The driving electrodes 31 and the sensing electrodes 32 can be formed of a transparent conductive layer such as ITO (indium tin oxide). Other transparent material can also be used. Alternatively, the driving electrodes 31 and the sensing electrodes 32 can be formed of a metal mesh. The metal mesh can be manufactured by finely patterning a metal having high conductivity.

The metal mesh can be manufactured by a printing, imprinting, lithography, or like techniques. In the printing technique, a transparent electrode (or wire) is directly formed of a transparent conductive material (or metal material) on a substrate by using a gravure or offset technique. In the imprinting technique, a fine pattern is formed on a transparent conductive layer or a metal layer, and the transparent conductive layer (or metal layer) is etched through the fine pattern to form the transparent electrode (or wire). In the lithography technique, a fine pattern is formed on the substrate through a source such as light, a laser, or an electronic beam, and the transparent conductive layer (or metal layer) is etched by using the fine pattern to form the transparent electrode (or wire).

A number of metal patterns forming the metal mesh can be formed of a metal material such as copper (Cu), aluminum (Al), molybdenum (Mo), and silver (Ag) to have a line width of 0.1 um to 10 um. The driving electrodes 31 and the sensing electrodes 32 formed of the metal mesh have high conductivity and high transparency.

The insulating layer is interposed between the driving electrodes 31 and the sensing electrodes 32 to separate the driving electrodes 31 and the sensing electrodes 32. An inorganic insulating material such as a silicon oxide ($SiO_x$) or a silicon nitride ($SiN_x$) can be used as the insulating layer. Alternatively, as the insulating layer, an organic insulating material such as a cellulose derivative, an olefin-based resin, an acryl-based resin, a vinyl chloride-based resin, a styrene-based resin, a polyester-based resin, a polyamide-based resin, a polycarbonate-based resin, a polycycloolefin resin, or an epoxy resin can be used.

The driving electrodes 31 and the sensing electrodes 32 are separated by the insulating layer to form a capacitance between the driving electrodes 31 and the sensing electrodes 32.

The touch controller 34 can apply a touch detection signal to the driving electrodes 31 through the sensing wirings 33, and can detect a touch position by receiving sensing signals indicating a change in capacitance of the sensing electrodes 32 through the sensing wirings 33.

Figure 3:
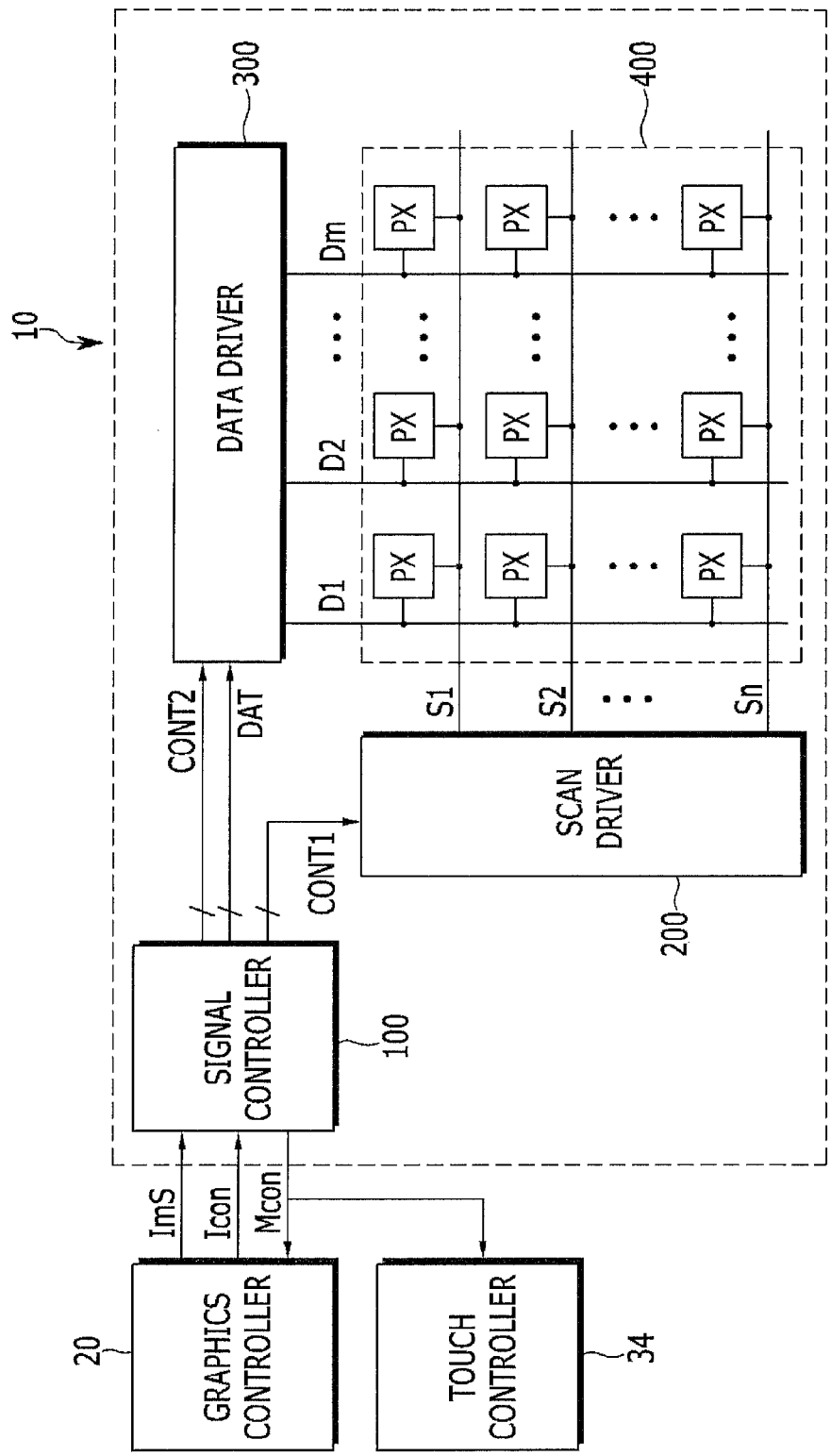
FIG. 3 is a block diagram showing a display device in accordance with an exemplary embodiment.

FIG. 3 is a block diagram showing the display device in accordance with an exemplary embodiment. FIG. 3 can be an example of the display panel 10 shown in FIG. 1.

Referring to FIG. 3, the display device 10 includes a signal controller 100, a scan driver 200, a data driver 300, and a display unit 400.

The display unit 400 includes a plurality of pixels PX substantially arranged in a matrix pattern, a plurality of scanning lines S1 to Sn, and a plurality of data lines D1 to Dm. The pixels PX are connected to the scanning lines S1 to Sn and the data lines D1 to Dm. The scanning lines S1 to Sn substantially extend in a row direction arranged in parallel, and the data lines D1 to Dm substantially extend in a column direction arranged in parallel.

The signal controller 100 receives an image signal ImS and an input control signal Icon inputted from a graphics controller 20 to control operations of the scan driver 200 and the data driver 300. The image signal ImS contains luminance information of the pixels. The luminance information includes a predetermined number of grays, for example, 1024 ($=2^{10}$), 256 ($=2^8$), or 64 ($=2^6$) grays. The input control signal Icon may include a data enable signal DE, a horizontal synchronizing signal Hsync, a vertical synchronization signal Vsync, and a main clock signal MCLK.

The signal controller 100 generates a first driving control signal CONT1, a second driving control signal CONT2, and an image data DAT according to the image signal ImS and the input control signal Icon. The signal controller 100 generates the image data DAT by dividing the video signal ImS in a frame unit according to the vertical synchronization signal Vsync and dividing the image data signal ImS to a scan line unit according to the horizontal synchronization signal Hsync The signal controller 100 transfers the first driving control signal CONT1 to the scan driver 200. Further, the signal controller 100 transfers the image data DAT together with the second driving control signal CONT2 to the data driver 300.

The scan driver 200 is connected to the plurality of scanning lines S1 to Sn, and generates the plurality of scanning signals depending on the first driving control signal CONT1. The scan driver 200 may sequentially apply scanning signals having a gate-on voltage to the plurality of scanning lines S1 to Sn.

The data driver 300 is connected to the data lines D1 to Dm. The data driver 300 may include a memory. The data driver 300 can sample and hold the inputted image data DAT according to the second drive control signal CONT2, and applies a plurality of data signals to the data lines D1 to Dm. Further, the data driver 300 may apply a data signal with a predetermined voltage range to the data lines D1 to Dm corresponding to the scanning signals.

In the meantime, the signal controller 100 may be implemented in the data driver 300. In other words, the data driver 300 may be implemented as a driving IC performing the function of the signal controller 100.

The signal controller 100 generates a multiple control signal Mcon for controlling the timing of recording of the image signal ImS and the timing of driving of the touch screen panel 30. The multiple control signal Mcon is transferred to the graphics controller 20 and the touch controller 34.

The timing of recording of the image signal ImS inputted from the graphics controller 20 into the signal controller 100 is controlled by the multiple control signal Mcon. If the recording rate of the image signal ImS is greater or less than the rate at which the data signals are written in the pixels by the data driver 300, tearing can occur. Tearing can be prevented by controlling the recording timing of the image signal ImS using the multiple control signal Mcon.

Moreover, using the multiple control signal Mcon, the touch controller 34 can control the timing of the driving of the touch panel in a manner to avoid or minimize tearing or noise. As shown in FIG. 1, as the touch screen panel 30 is attached to the surface of the display panel 10, when a driving time of the touch screen panel 30 overlaps with that of the display panel 10, noise is generated due to the coupling of the touch screen panel 30 to the sensing wiring 33. Noise generation can be prevented by controlling the timing of the driving of the touch screen panel 30 using the multiple control signal Mcon.

A driving method of a display device using the multiple control signal Mcon will be described in detail later with reference to FIGS. 4-6.

The signal controller 100, the scan driver 200, and the data driver 300 can be directly mounted on the display unit 400 in the form of at least one IC chip, can be mounted on a flexible printed circuit film (FPC), can be attached on the display unit 400 in the form of a tape carrier package (TCP), or can be mounted on a separate printed circuit board (PCB). Alternatively, the signal controller 100, the scan driver 200, and the data driver 300, can be integrated on the display unit 400 together with the scanning lines S1 to Sn and the data lines D1 to Dm.

Figure 4:
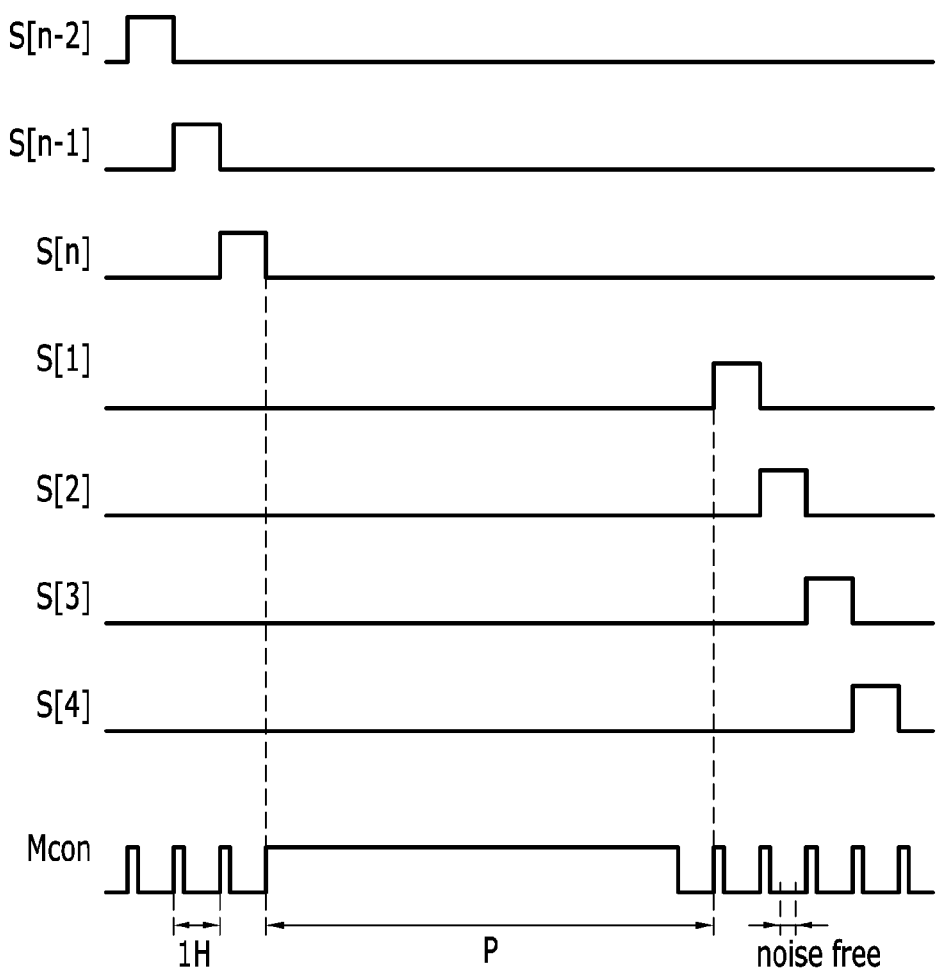
FIG. 4 is a timing diagram of a driving method for a display device in accordance with an exemplary embodiment.

FIG. 4 is a timing diagram of a driving method for a display device in accordance with an exemplary embodiment.

Referring to FIG. 4, the scan driver 200 applies scanning signals S[1] to S[n] having a gate-on voltage to the scan lines S1 to Sn for one frame. The scanning signals S[1] to S[n] having a gate-on voltage can be synchronized with the horizontal synchronizing signals Hsync. In FIG. 4, the scanning signals S[1] to S[n] having a gate-on voltage are indicated as high level voltages. Alternatively, the signals S[1] to S[n] having a gate-on voltage may be low level voltages depending on the configuration of the pixel circuit.

A porch period P is provided between a plurality of frames. The porch period P can range from a time at which the last scanning signal S[n] having a gate-on voltage is applied in a first frame and up to and before a first scanning signal S[1] having a gate-on voltage is applied in a subsequent frame. The porch period P serves to prevent or minimize tearing if the timing difference between the recording of the image signal ImS and writing of the data in the pixels PX is minimized.

The multiple control signal Mcon can be generated using a waveform that switches between a high level voltage and a low level voltage in a frame. For example, the multiple control signal Mcon can switch between a high level voltage and a low level voltage during one horizontal period 1H. One horizontal period 1H can be the same as that of the horizontal synchronizing signal Hsync or the data enable signal DE. The scanning signals S[1] to S[n] having a gate-on voltage can be sequentially applied to the scan lines S1 to Sn by a pulse width of one horizontal period. The gate-on voltage can be applied to the scanning signals S1 to Sn when the multiple control signal Mcon switches to a high level voltage.

The multiple control signal Mcon can then be maintained at a high level voltage in the porch period P. The multiple control signal Mcon can switch to a low level voltage one horizontal period 1H before the porch period P ends. Subsequently, the first scanning signal S[1] of the next frame is applied.

The graphics controller 20 can recognize the porch period P, as the period during which the multiple control signal Mcon is a high level voltage. In other words, the graphics controller 20 can recognize the start time and the end time of the porch period P of the display panel 10. The graphics controller 20 can also recognize the start and end times of a data writing period during which the scanning signals S[1] to S[n] have a gate-on voltage. The graphics controller 20 can determine the start of the recording of the image signal ImS based on the recording rate of the image signal ImS and the writing rate of the data signals. The first recording of the image signal ImS can start after the porch period P starts. The first recording duration may be one horizontal period 1H or more.

The touch controller 34 can recognize when the scanning signals S[1] to S[n] have the gate-on voltage in a frame, as the multiple control signal Mcon switches to a high level voltage. Data signals are applied to the data lines D1 to Dm for one horizontal period 1H during which one scanning signal has a gate-on voltage. The voltage of the data lines D1 to Dm is varied for a predetermined time period that is shorter than one horizontal period 1H. The voltage variation is made from the time at which the scanning signals have the gate-on voltage. No more voltage variation is made in the scan lines S1 to Sn or the data lines D1 to Dm for a noise free period, defined as a period from a time after the voltage of the data lines D1 to Dm is varied up to and before the next scanning signal is applied. The touch controller 34 can determine the timing of driving of the touch panel such that the touch detection signals are applied to the driving electrodes 31 to sense a change in capacitance of the sensing electrodes 32 during the noise free period. The noise free period can be defined from a time when the multiple control signal Mcon switches to a high level voltage after a second recording in the frame.

Figure 5:
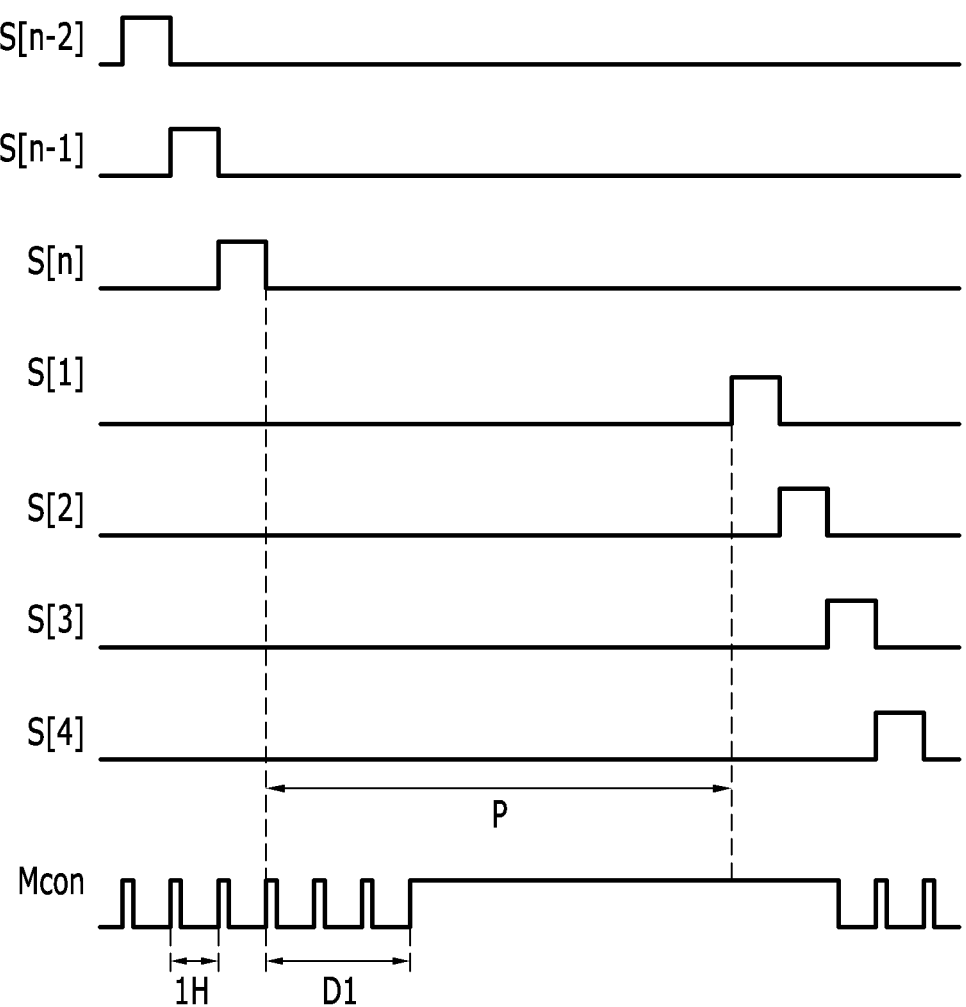
FIG. 5 is a timing diagram of a driving method for a display device in accordance with another exemplary embodiment.

FIG. 5 is a timing diagram of a driving method for a display device in accordance with another exemplary embodiment.

The multiple control signal Mcon can be in a waveform that switches between a high level voltage and a low level voltage for a predetermined first delay time D1 after the frame ends, and maintains a high level voltage after the first delay time D1 up to and before the next frame starts. The first delay time D1 can be synchronized to occur with the first recording. The timing of the first recording can be determined based on the recording rate of the image signal ImS and the writing rate of the data signals. The first delay time D1 may be one horizontal period 1H or more. The graphics controller 20 can start the recording of the image signal ImS when the multiple control signal Mcon switches to and maintains a high level voltage in the porch period P.

Accordingly, the graphics controller 20 does not perform an additional operation to determine the start of the recording of the image signal ImS.

The period during which the multiple control signal Mcon is mainted at a high level voltage can be synchronized to be during the same period as the porch period P. Alternatively, the multiple control signal Mcon may be mained at a high level voltage but switched to a low level voltage one horizontal period 1H before the porch period P ends.

Figure 6:
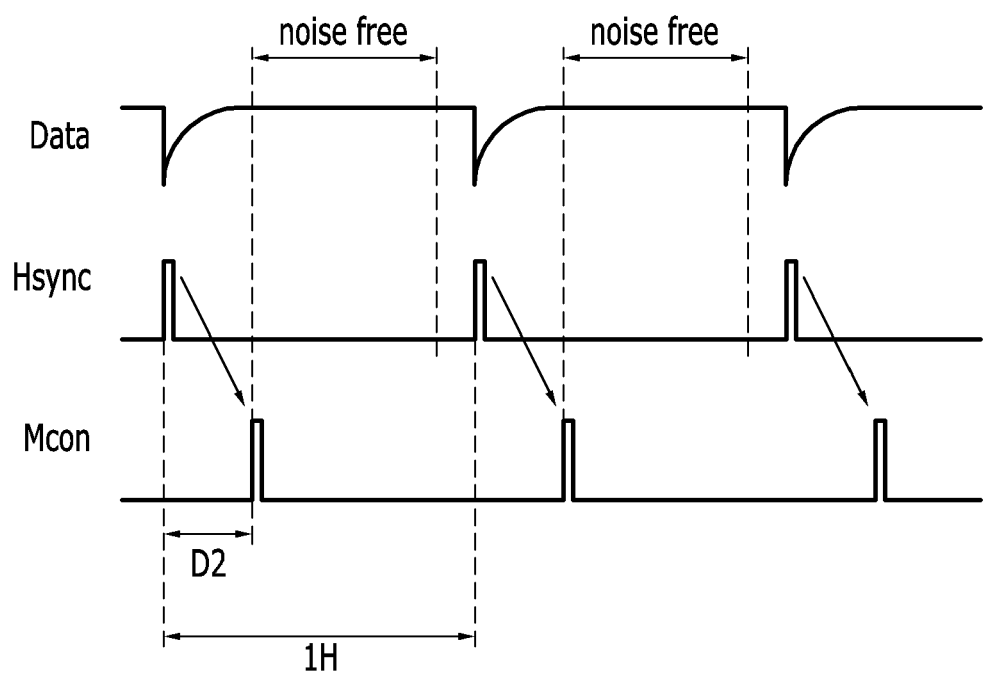
FIG. 6 is a timing diagram of a driving method for a display device in accordance with yet another exemplary embodiment.

FIG. 6 is a timing diagram of a driving method for a display device in accordance with yet another exemplary embodiment.

The multiple control signal Mcon can switch between a high level voltage and a low level voltage after a second delay time D2 occurring after the horizontal synchronizing signal Hsync switches to a high level voltage in the frame. Data signals Data are applied to the data lines D1 to Dm for one horizontal period 1H during which one scanning signal having the gate-on voltage is applied. The voltage of the data lines D1 to Dm is varied for a time period that is shorter than one horizontal period 1H starting from a time when the scanning signals having the gate-on voltage are applied. No more voltage variation is made in the scan lines S1 to Sn or the data lines D1 to Dm for a noise free period, defined as a time period from a time after the voltage of the data lines D1 to Dm is varied up to and before the next scanning signal is applied.

The second recording can occur during the noise free period after the second delay time D2. That is, the multiple control signal Mcon switches to a high level voltage after the second delay time D2.

When the multiple control signal Mcon switches to a high level voltage after the second delay time D2, the touch controller 34 can apply the touch detection signals to the driving electrodes 31 to sense the change in capacitance of the sensing electrodes 32. The touch controller 34 can therefore determine the timing of the driving of the touch screen panel 30 when the multiple control signal Mcon switches to a high level voltage in the frame. Accordingly, the touch controller 34 does not have to perform an additional operation to determine the noise free period.

Since the graphics controller 20 and the touch controller 34 can both perform their respective functions using only one multiple control signal Mcon, only one output pad is used. The need for multiple output pads is alleviated.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the present disclosure. Therefore, those skilled in the art will understand that various modifications and other equivalent embodiments of the present invention are possible.

What is claimed is:

1. A display device comprising:
a display panel configured to include a plurality of pixels, a scan driver for applying a scanning signal having a gate-on voltage to a plurality of scan lines connected to the pixels, a data driver for applying a data signal to a plurality of data lines connected to the pixels, and a signal controller for controlling operations of the scan driver and the data driver by receiving an image signal from a graphics controller; and
a touch screen panel configured to include a touch controller for detecting a touch position by receiving a detection signal from a plurality of sensing electrodes,
wherein the signal controller is configured to generate a multiple control signal for controlling timing of recording of the image signal and timing of driving of the touch screen panel, and the signal controller is further configured to transmit the multiple control signal to the graphics controller and the touch controller.

2. The display device of claim 1, wherein the multiple control signal is a waveform switched between a high level voltage and a low level voltage in a frame, and maintained at the high level voltage in a porch period between a plurality of frames.

3. The display device of claim 2, wherein the multiple control signal switches between the high level voltage and the low level voltage by one horizontal period in the frame.

4. The display device of claim 3, wherein the scanning signal is sequentially applied to the scanning lines in a pulse width of the horizontal period.

5. The display device of claim 3, wherein the multiple control signal switches to the low level voltage one horizontal period before the porch period ends.

6. The display device of claim 5, wherein the multiple control signal switches to the high level voltage when the porch period ends.

7. The display device of claim 3, wherein the graphics controller is configured to start a first recording of the image signal after the porch period starts.

8. The display device of claim 7, wherein the first recording time is one horizontal period or more.

9. The display device of claim 3, wherein the touch controller is configured to drive the touch screen panel for a duration after a second recording of the image signal when the multiple control signal switches to the high level voltage in the frame.

10. The display device of claim 9, wherein the second recording time is shorter than one horizontal period.

11. The display device of claim 2, wherein the multiple control signal switches to and maintains the high level voltage a delay time after the frame ends.

12. The display device of claim 11, wherein the touch controller is configured to drive the touch screen panel when the multiple control signal switches to the high level voltage in the frame.

13. The display device of claim 1, wherein the multiple control signal is a waveform switched between a high level voltage and a low level voltage in a frame and until a predetermined time after the frame ends, and maintains the high level voltage in a porch period between a plurality of frames after the predetermined time.

14. The display device of claim 13, wherein the graphics controller is configured to record the image signal when the multiple control signal is maintained at the high level voltage in the porch period.

15. A driving method of a display device including a touch screen panel, the method comprising:
generating a multiple control signal in a waveform switched between a high level voltage and a low level voltage in a frame during which a data signal is applied to a plurality of pixels, the multiple control signal for controlling timing of recording of an image signal and timing of driving of the touch screen panel;
generating the multiple control signal at the high level voltage in a porch period between a plurality of frames;
performing a first recording of the image signal when the porch period starts; and
driving the touch screen panel for a duration after a second recording of the image signal when the multiple control signal switches to the high level voltage in the frame.

16. The driving method of claim 15, wherein the multiple control signal switches between the high level voltage and the low level voltage by one horizontal period in the frame.

17. The driving method of claim 16, wherein the multiple control signal switches to the low level voltage one horizontal period before the porch period ends.

18. The driving method of claim 17, wherein the multiple control signal switches to the high level voltage when the porch period ends.

19. The driving method of claim 15, wherein the first recording time is one horizontal period or more.

20. The driving method of claim 15, wherein the second recording time is shorter than one horizontal period.

* * * * *